(12) United States Patent
Reiker

(10) Patent No.: US 6,291,768 B1
(45) Date of Patent: *Sep. 18, 2001

(54) ELECTRICAL BOXES WITH AUXILIARY SUPPORTS FOR CARRYING FIXTURES

(75) Inventor: Kenneth H. Reiker, Shalimer, FL (US)

(73) Assignee: Reiker Enterprises of Northwest Florida, Inc., Shalimar, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/862,380

(22) Filed: May 23, 1997

Related U.S. Application Data

(63) Continuation-in-part of application No. 08/490,757, filed on Jun. 16, 1995, now Pat. No. 5,677,512, and a continuation-in-part of application No. 08/371,695, filed on Jan. 12, 1995, now Pat. No. 5,854,443

(60) Provisional application No. 60/023,060, filed on Aug. 2, 1996, and provisional application No. 60/018,227, filed on May 24, 1996.

(51) Int. Cl.$^7$ ........................................................ H02B 1/42
(52) U.S. Cl. .............................. 174/62; 220/3.3; 220/3.9; 248/205.3; 248/906
(58) Field of Search .................................. 174/51, 58, 61, 174/62, 48, 53, 57; 220/3.2, 3.3, 3.8, 3.9; 248/906, 205.3

(56) References Cited

U.S. PATENT DOCUMENTS

| | | |
|---|---|---|
| Re. 33,147 | 1/1990 | Reiker . |
| Re. 34,603 | 5/1994 | Caison et al. . |
| 629,373 | 7/1899 | Kern et al. . |
| 950,176 * | 2/1910 | Hublinger ............................. 174/62 |
| 1,040,175 | 10/1912 | Earhart . |
| 1,922,432 * | 8/1933 | Gould .................................. 220/3.94 |
| 2,305,015 | 12/1942 | Langer . |
| 2,713,983 | 7/1955 | Kay . |
| 2,959,633 | 11/1960 | Palmer et al. . |
| 3,104,087 | 9/1963 | Budnick et al. . |
| 3,214,126 | 10/1965 | Roos . |
| 3,340,349 * | 9/1967 | Zerwes ................................... 174/53 |
| 3,616,096 * | 10/1971 | Roeder ......................... 248/205.3 X |
| 3,740,451 | 6/1973 | Schindler et al. . |
| 3,770,872 * | 11/1973 | Brown ................................... 174/53 |
| 4,019,647 | 4/1977 | Arnold . |
| 4,082,915 | 4/1978 | Silver . |
| 4,263,472 | 4/1981 | Maheu . |
| 4,275,862 | 6/1981 | Takagi et al. . |
| 4,281,773 * | 8/1981 | Mengeu ............................. 174/53 X |
| 4,304,957 | 12/1981 | Slater et al. . |
| 4,306,109 * | 12/1981 | Nattel ................................... 174/51 |

(List continued on next page.)

FOREIGN PATENT DOCUMENTS

| | | |
|---|---|---|
| 2436518 | 4/1980 | (FR) . |
| 1309950 | 3/1973 | (GB) . |

Primary Examiner—Dean A. Reichard
(74) Attorney, Agent, or Firm—Shlesinger, Arkwright & Garvey LLP

(57) ABSTRACT

An electrical junction box or mounting assembly includes a box having a top wall and a side wall. The side wall extends downwardly away from the top wall and defines a cavity therein. An auxiliary fixture support is disposed in the cavity. An opening or seat is provided in the side wall, and the auxiliary fixture support extends into such opening or seat. A threaded hole may be provided on the auxiliary fixture support. The auxiliary fixture support may be a lug. Preferably, the fixture support has an extension for engaging a side wall of the junction box for counteracting any tendency of the support to move or rotate when carrying a fixture or ceiling fan. Preferably, the auxiliary fixture support is sufficiently smooth for preventing wear to plastic-coated electrical wire which engages exposed surfaces of the fixture support.

71 Claims, 7 Drawing Sheets

U.S. PATENT DOCUMENTS

| | | | |
|---|---|---|---|
| 4,315,100 | * | 2/1982 | Haslbeck et al. ............... 174/53 X |
| 4,463,923 | | 8/1984 | Reiker . |
| 4,909,405 | | 3/1990 | Kerr, Jr. . |
| 4,919,292 | * | 4/1990 | Hsu ............................ 174/61 X |
| 4,960,964 | | 10/1990 | Schnell et al. . |
| 4,988,067 | | 1/1991 | Propp et al. . |
| 5,303,894 | | 4/1994 | Deschamps et al. . |
| 5,349,134 | | 9/1994 | Russell . |
| 5,359,152 | * | 10/1994 | Hone-Lin ........................ 174/53 |
| 5,435,514 | | 7/1995 | Kerr, Jr. . |
| 5,860,548 | | 1/1999 | Kerr, Jr. . |

* cited by examiner

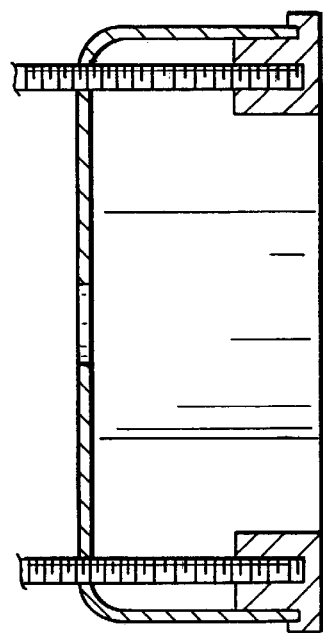
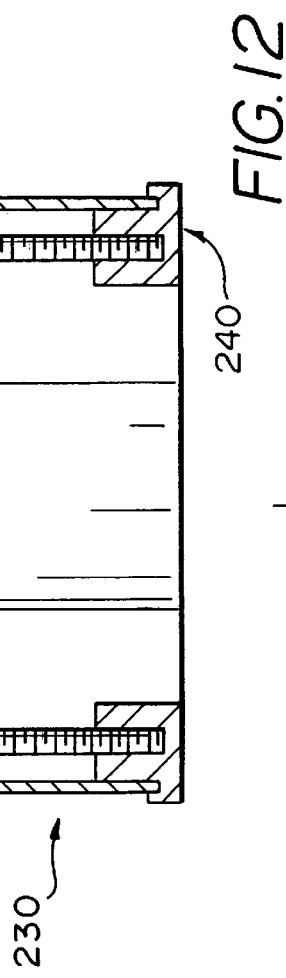
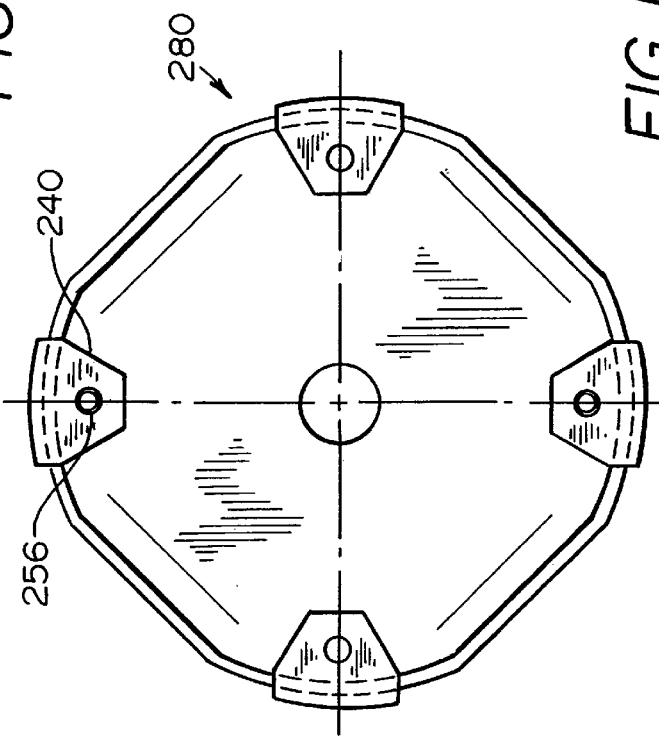
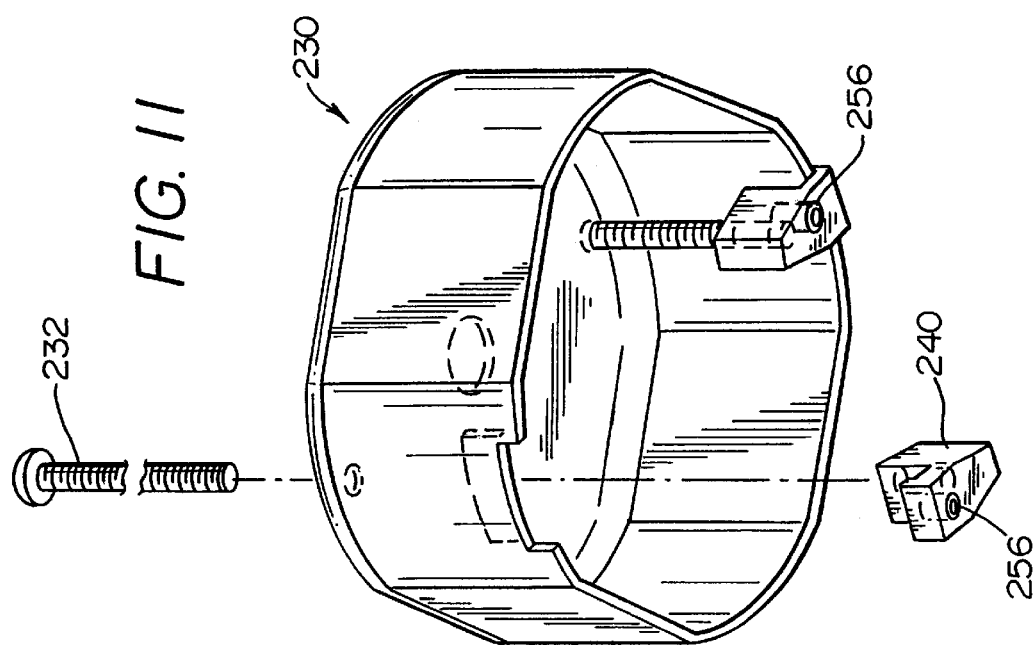

ELECTRICAL BOXES WITH AUXILIARY SUPPORTS FOR CARRYING FIXTURES

This application claims the priority of application Ser. No. 60/023,060, filed Aug. 2, 1996, and this application claims the priority of application Ser. No. 60/018,227, filed May 24, 1996; and this application is a continuation-in-part of application Ser. No. 08/490,757, filed Jun. 16, 1995, now U.S. Pat. No. 5,677,512, issued Oct. 14, 1997, and this application is a continuation-in-part of application Ser. No. 08/371,695, filed Jan. 12, 1995, now U.S. Pat. No. 5,854,443, issued Dec. 29, 1998, and each of which is incorporated herein by reference.

This application likewise relates to application Ser. No. 08/862,378, filed May 23, 1997, now U.S. Pat. No. 5,909,006, issued Jun. 1, 1999, and application Ser. No. 08/862,379, filed May 23, 1997, now U.S. Pat. No. 5,965,845, issued Oct. 12, 1999, and each of which is incorporated therein by reference.

FIELD OF THE INVENTION

The present invention relates to electrical boxes and methods of producing the same.

BACKGROUND OF THE INVENTION

Consumers, updated National Electrical Codes (NEC), and Underwriter Laboratories (UL) requirements all require that electrical boxes be made stronger than in the prior art.

OBJECTS AND SUMMARY OF THE INVENTION

An object of the invention is to overcome the drawbacks of known electrical boxes.

A further object of the invention includes making electrical boxes which use the standard punched-out, stamped electrical boxes in a more intelligent fashion.

Yet another object of the invention is to take out the radius of a standard industry size electrical box so that a support screw for supporting a fixture can be located the proper distance from a second support screw to meet National Electrical Code (NEC) standards.

Another object of the invention is to eliminate the problem of the upper radius between the top wall and side wall of electrical boxes that prevents fixture support studs from being fitted next to the inside face of such side walls.

Another object of the invention is to achieve a strengthened electrical box with an auxiliary support within a standard so-called "4×4" box, insertable into a standard opening, while maintaining the near universal 3.5 inch (8.9 cm) spacing between the fixture supports so that the box is usable with standard light fixtures, ceiling fans, and the like.

It is likewise an object of the invention to provide an auxiliary metal inserts in the electrical boxes to enhance the carrying strength of the electrical boxes.

A further object of the invention is to provide studs in the electrical boxes that strengthen the electrical boxes.

Yet another object of the invention is to provide studs in the electrical boxes which cover the threads of standard screws so that no screw threads are present in the interior of such electrical boxes.

A still further object of the invention is to provide an electrical box having an auxiliary support with a sufficiently smooth exterior for preventing wear to the plastic coating of plastic-coated electrical wire.

It is yet another object of the invention to provide electrical boxes in which added supports, such as lugs, are added during the manufacturing process to eliminate problems in prior art electrical boxes, as well as to strengthen the inventive electrical boxes.

Another object of the invention is to provide a junction box having an auxiliary support, yet which requires no welding during assembly thereof.

Yet another object of the invention is to provide an electrical box having components which are easily fabricated, added to the electrical box, and assembled in the final form by the operation of screwing or riveting, yet which do not loosen when subjected to static and/or dynamic loading.

A still further object of the invention is to provide a junction box in which the auxiliary support or lug for carrying static and dynamic loads automatically engages the side walls of the junction box during assembly and/or in use thanks to the use of cutouts and/or seats in the side wall thereof and/or thanks to the auxiliary support being configured for engaging the side wall thereof when the auxiliary support is attached and located in its attached, final form ready for use.

A still further object of the invention is to provide a junction box capable of carrying static and/or dynamic loads having an auxiliary support and that is assembled with fewer parts and with fewer steps than known devices.

It is a yet further object that all the above be carried out with an electrical box which carries the load of supported static and dynamic fixtures better than known electrical boxes.

In summary, the present invention is directed to an electrical junction box or mounting assembly which includes a box having a top wall and a side wall. The side wall extends downwardly away from the top wall and defines a cavity therein. An auxiliary fixture support is disposed in the cavity. An opening is provided in the side wall, and the auxiliary fixture support extends into the opening. A threaded hole may be provided on the auxiliary fixture support. The auxiliary fixture support may be a lug. Preferably, the auxiliary fixture support is sufficiently smooth for preventing wear to plastic-coated electrical wire which engages exposed surfaces of the fixture support.

These objects and advantages as well as others will be readily apparent from a review of the following description and drawings.

The drawings show a variety of embodiments of the invention, as will be clear from reading the description below.

It is important to note that the use of relative terms such as "up" and "down", and "left" and "right" is for convenience only and is not intended to be limiting.

BRIEF DESCRIPTION OF THE DRAWINGS

FIG. 11 is a bottom perspective view of yet another preferred embodiment of a junction box according to the invention, shown partially assembled;

FIG. 12 is a cross-sectional view of the junction box of FIG. 11;

FIG. 13 is a bottom plan view of a further preferred embodiment of the invention.

DESCRIPTION OF THE PRIOR ART

Figure 1:
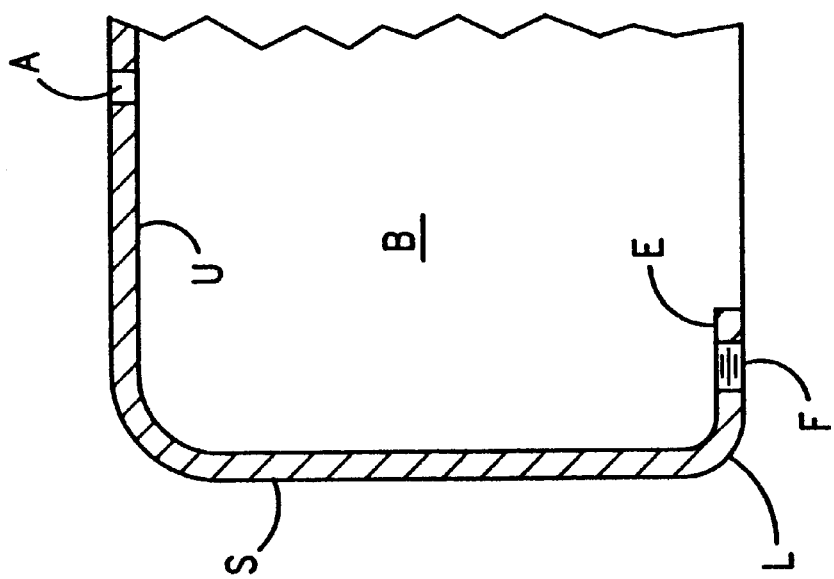
FIG. 1 is a cross sectional view of a PRIOR ART electrical junction box having an inwardly extending ear E with a faceplace plate attachment hole F provided therein.

FIG. 1 shows a PRIOR ART junction box including a side wall S, an upper wall U, and an ear E extending from a lower portion L thereof.

Upper wall U has one or more attachment holes A through which fasteners will be inserted for attaching PRIOR ART electrical box B to an overhead surface, such as to a ceiling joist or piece of plywood extending therebetween.

A lower, faceplate attachment hole F is typically provided in inwardly extending ear E. Frequently, faceplate hole F is provided with threads for mating with respective faceplate fasteners when securing an unillustrated faceplate thereto. Such faceplates are used to enclose electrical box B after the wiring inside the electrical box/junction box B has been completed.

A drawback of such PRIOR ART electrical boxes E is that they are typically made with stamped sheet metal extensions E; consequently, extensions E are relatively thin (i.e., in the order of about 1 millimeter or less). Such extension or ear E has a width of only a few millimeters,and only extends several millimeters inside box B. Thus, the surface area of ear E, when viewed from below after installation of upper wall U against a typical horizontal ceiling, is often substantially less than one centimeter squared (1 cm$^2$).

Consequently, ear E may only carry relatively small vertical loads, when installed against the ceiling, as described above.

As a result, local codes frequently allow such PRIOR ART boxes B to be used only for supporting the weight of a faceplate, or of a relatively light static load, such as a small light fixture.

Such electrical boxes B are unsuited for supporting large static loads, as well as for supporting large dynamic loads, such as ceiling fans which may weigh twenty-five kilograms or more (25 kg).

Thus, there is a need for an electrical box which is suited for carrying relatively large static loads as well as dynamic loads.

That need is especially clear, given that many homeowners want to install heavier light fixtures and dynamic loads, such as ceiling fans, than had exhibited such preferences in the past.

Furthermore, even if the initial owner/builder of a house or commercial space provides PRIOR ART load-carrying junction boxes B suited for carrying the vertical force of a small light fixture, a subsequent owner/user will often replace the original light fixture with a heavier light fixture, or with a dynamic load; i.e. a ceiling fan.

Accordingly, there is a need for a load-carrying junction box which is suited for a wide range of static and dynamic loads and, thus, suited for original installation in new construction, given that some users fail to upgrade load-carrying junction boxes when adding heavier static and/or dynamic loads to the box.

The electrical box according to the invention has overcome these drawbacks described immediately above, and has achieved the objects of the invention detailed above. Such will be evident when reading the following detailed description of the invention.

DETAILED DESCRIPTION OF THE INVENTION

Figure 2:
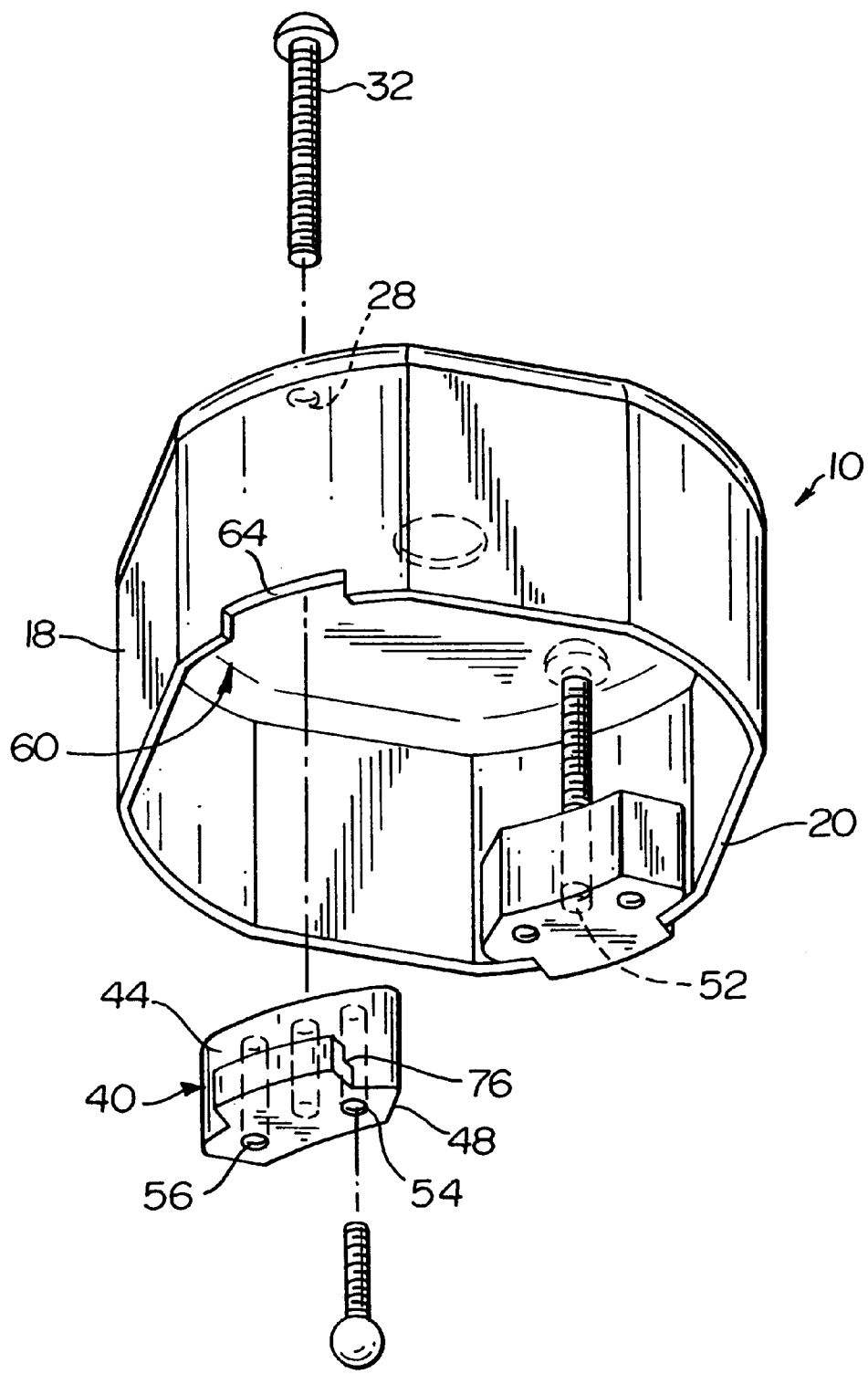
FIG. 2 is a bottom perspective view of a preferred embodiment of an electrical junction box according to the invention having seats in a side wall thereof, prior to addition of a second auxiliary support.
Figure 3:
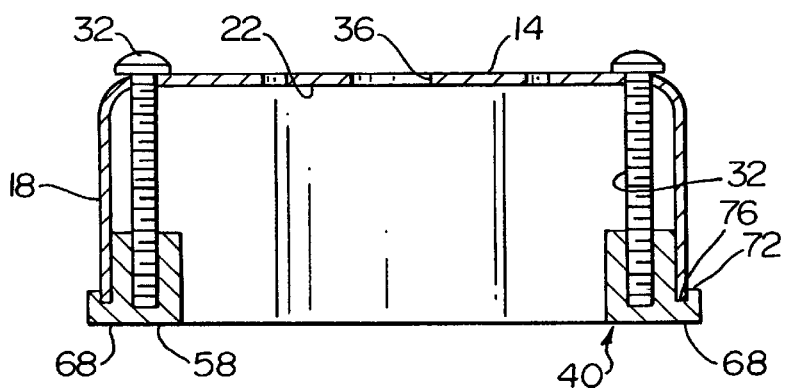
FIG. 3 is a cross-sectional view of the preferred embodiment of FIG. 2 showing the assembled junction box.

Turning to FIGS. 2 and 3, a first preferred embodiment of an electrical box and/or junction box 10 according to the invention will now be described in detail.

Junction box 10 includes a top wall 14, and a side wall 18 extending downwardly therefrom and defining a cavity therein. Side wall 18 includes a lower free edge 20, and top wall 14 includes a lower face 22.

Typically, at least one hole 28 will be provided adjacent the punchout region for receiving a fastener 32 therethrough.

Additional holes 36 for receiving portions of an electrical fixture, for example, and/or for fasteners which secure junction box 10 to a ceiling, for example, may likewise be provided.

An auxiliary support or lug 40 may be provided for increasing the holding strength of junction box 10.

An auxiliary support 40 may be made with a height substantially equal to or less than the distance between lower free edge 20 and lower face 22 of top wall 14.

When increased resistance to inadvertent turning of an auxiliary support 40 about the longitudinal axis of fastener 32 is desired, an auxiliary support 40 may be provided with a face 44 configured for engaging with a portion of side wall 18 for restricting rotation of an auxiliary support 40. As shown in FIG. 2, configured face 44 may be made as a slightly rounded or substantially flat face. The non-configured exterior face of an auxiliary support 40 may be made as a rounded or as a multifacted face 48, as shown.

Good results have been achieved when a threaded hole 52 is provided extending at least partially through an auxiliary support lug 40. Preferably, threaded hole 52 has threads selected to mate with those of fasteners 32.

An auxiliary support 40 may be attached to box 14 by use of a powered screwdriver driving (i.e., turning) fastener 32 into threaded hole 52. The threads of threaded hole 52 may extend all the way through or partially through support 40, as shown in FIGS. 2 and 3.

One or more bottom threaded holes 54 and 56 may be provided on a lower face 58, so that an additional, unillustrated fastener for attaching a light fixture or ceiling fan, for example, may be attached to an auxiliary support 40 and, hence, to electrical box 10, from below during use.

The threads of hole 54 may be made of a different size than the threads of hole 56, so that one hole accommodates standard light fixture fasteners and the other threaded hole accommodates standard ceiling fan fasteners.

It is likewise contemplated that threads will only be provided at the bottom portion of fastener 32, or at both top and bottom portions with an unthreaded region in between.

Still further, it is expected that the threads 52 for mating with fastener 32 may be of a different size than the threads provided for mating with the fasteners which attach the ceiling fan or light fixture to the lower portion of support 40 when in use.

An extension 68 may be provided on support lug 40.

For additional security, a lip 72 may be provided on extension 68. Good results have been achieved when lip 72 extends upwardly and engages the outside of side wall 18. In that manner, lip 72 assists in securing support lug 40 to the remainder of box 10. In addition, such upwardly extending lip 72 assists in maintaining lug 40 positioned within seat 60, as well as assisting fastener 32, for example, in supporting the static and dynamic forces exerted by fixtures attached to lug 40, in use.

It will be readily appreciated, that extension 68 and lip 72 help tie the overall support structure together, especially when screw 32 has been tightened/torqued down to specifications for a particular application.

When two supports 40 are attached to the left and right ones of holes 28, placement of such supports 40 yields the added benefit of achieving a standard center-to-center spacing between respective threaded holes 56, 56 of each of the two opposed lugs, even when using a "standard" box forming equipment for making a standard box size, as discussed in greater detail below. Such also has the benefit of allowing use of standard equipment for forming holes in a sheetrock ceiling for receiving the box, while maintaining the standard 3.5 inch fixture support.

It will be appreciated that the preferred embodiment of FIGS. 2–3 yields a solution to the problems set forth in the previous pages. For large-scale production, a powered screwdriver can be used to assist in this major breakthrough by attaching support 40 to the top wall of the electrical box 10.

The embodiment of FIGS. 2 and 3 has not only achieved greater holding power or load-bearing strength than known electrical boxes, junction box 10 has been engineered so that the components fit together and stay together in the desired fashion. Lip 72 defines a channel 76 which may be shaped so as to abut lower free edge 20 along the length of lip 72.

Thus, it will be seen that the combination of fastener 32, lug 40, seat 60, extension 68, channel 72, and lip 76 work together to yield an overall device which resists loosening of the various components. Extension 68, lip 72, and the force exerted between screw 32 and threaded hole 52, for example, act to resist vertical movement, as well as rotation within a vertical plane, of lug 40.

Screw 32, configured face 44, channel 76 and lip 72, for example, act to resist movement in a horizontal plane, as well as rotation within vertical and horizontal planes, for example.

Those examples of resistance to movement of lug 40 relative to screw 32 and/or the remainder of box 10 are merely examples of the resistance to movement which lug 40 has achieved, whereby loosening of the various connections between screw 32, lug 40, and side wall 18 are prevented. In that manner, box 32 is suited for supporting relatively heavy static and dynamic loads.

It should be appreciated that resistance to such movement which might lead to loosening is particularly important when supporting ceiling fans, not only because such are heavy dynamic loads, but because the direction of spin of ceiling fans can typically be changed. Currently, ceiling fans are sold that have reversible motors so that the fan blades can be spun in opposite directions of rotation, depending on the user's preference for pulling air upwardly toward the ceiling or blowing air downwardly away from the ceiling.

The various described resistances to movements in vertical and horizontal planes is applicable to all the other preferred embodiments described herein.

Figure 4:
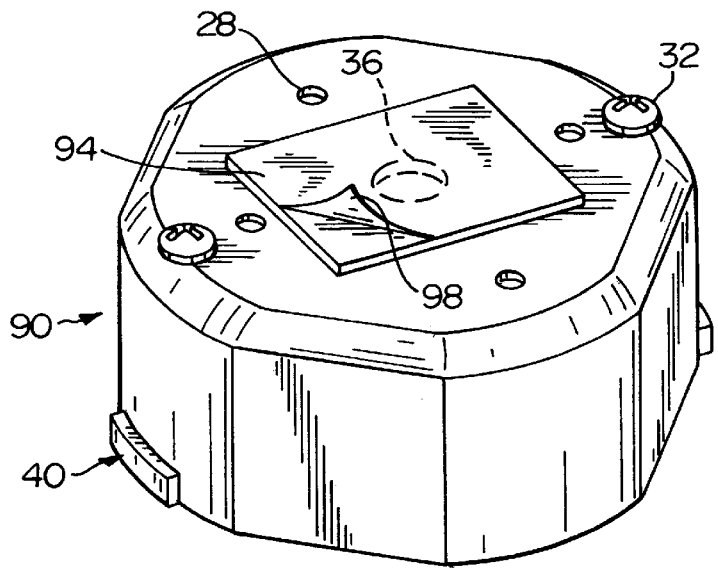
FIG. 4 is a top perspective view of yet another preferred embodiment of the invention, having a piece of double-sided tape on the top wall thereof for easing installation thereof.
Figure 5:
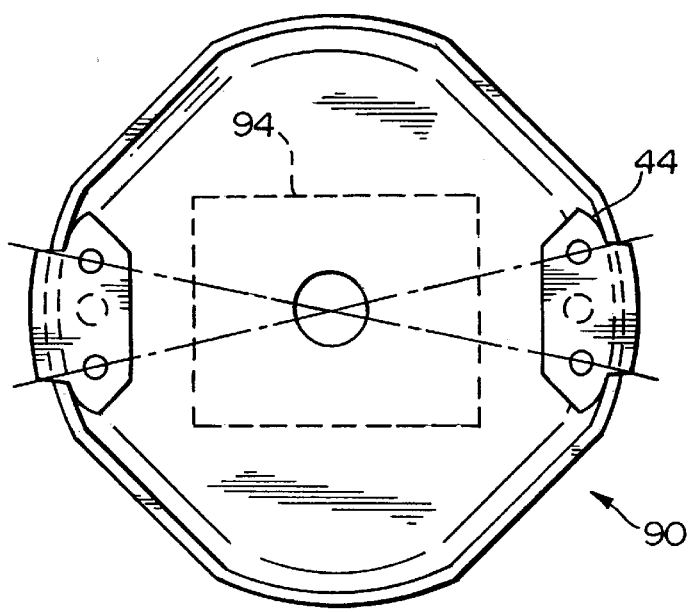
FIG. 5 is a bottom plan view of the preferred embodiment of FIG. 4.

FIGS. 4 and 5 show another preferred embodiment of a junction box 90 according to the invention.

Junction box 90 includes a piece of double-sided tape 94 on top wall 14 thereof. Double-sided tape 94 may be provided with a protective strip or layer 98 on the outer face thereof, i.e., on the face of double-sided tape 94 that has not been adhered to junction box 90. Conventional double-sided tape 94 may be used.

Alternative means for adhering junction box 90 to a surface may be used, such as spray-on adhesive, a piece of putty and other adhering means, such as described in my earlier U.S. patent application Ser. No. 08/490,757, filed Jun. 15, 1995, and Ser. No. 08/371,695, filed Jan. 12, 1995, each of which is incorporated herein by reference, may be utilized in conjunction with or instead of the double-sided tape 94.

One of the many advantages of junction box 90 is that the user may remove protective layer 98, and then adhere double-sided tape 94 to the surface to which junction box 90 is to be attached. Double-sided tape is selected and sized so that sufficient holding power for temporarily adhering junction box 94 to the surface is achieved, while the user has both hands free for permanently attaching junction box 90 in the desired location by nails (or shooting screws) through one or more holes 36.

Preferably, the adhesive is sufficiently strong to adhere box 90 to a horizontal surface located above the user's head.

The thickness of double-sided tape 94 is coordinated with the thickness (i.e., height) of the head of bolt 32 so that each performs its intended function, when junction box 90 is provided with screw 32 of FIGS. 2 and 3.

In a like manner, the height of the external portion of other fasteners used instead of screw 32 will be coordinated with the thickness of adhesive material or double-sided tape 94.

Alternatively, when attaching box 90 to a stud having a width less than distance between left and right heads of screws 32, double-sided tape 94 need not extend away from top wall 14 a distance greater than the height of the heads. That is because the stud would fit in between the offset left and right screw heads.

Figure 6:
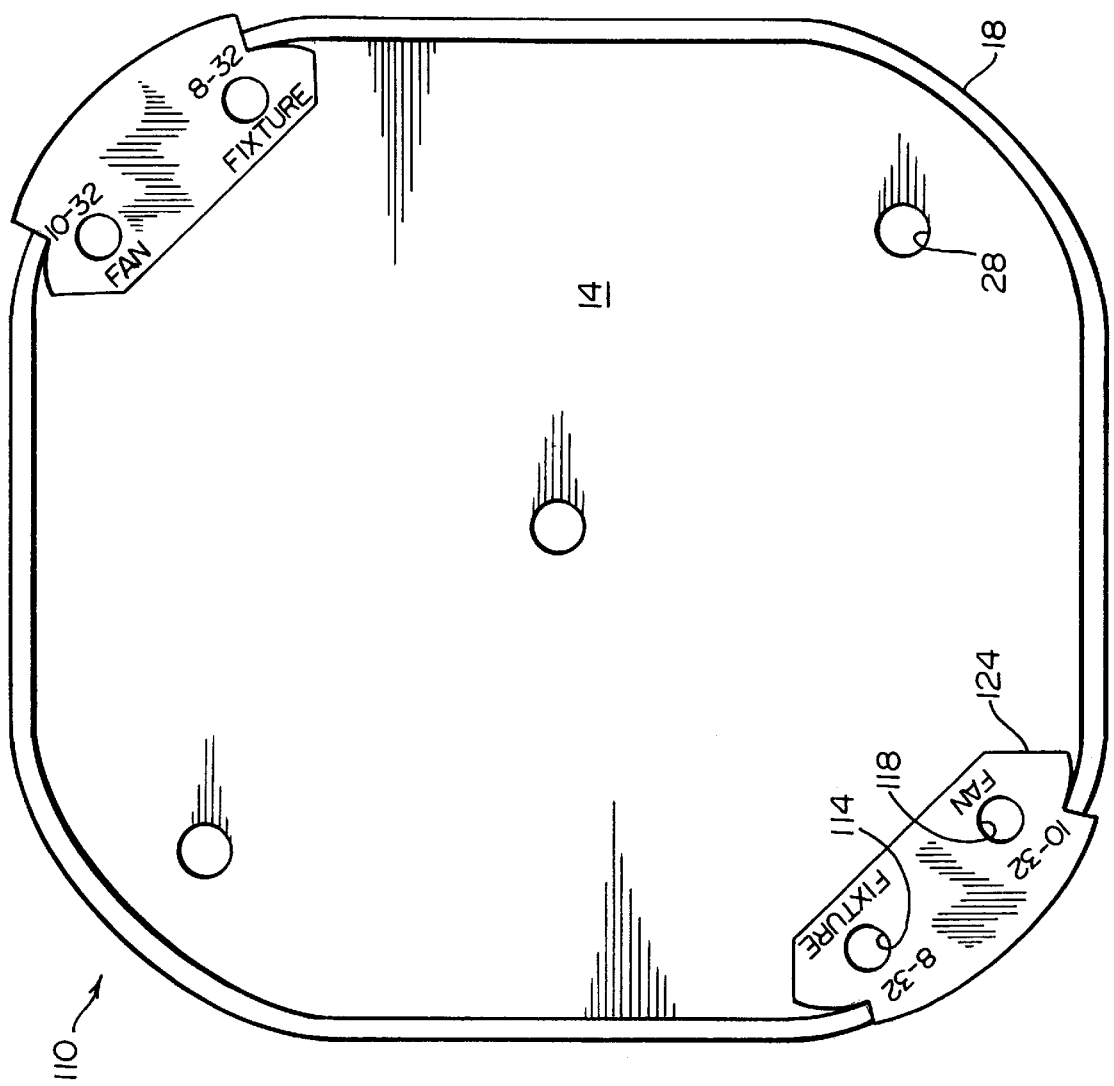
FIG. 6 is a bottom plan view of another preferred embodiment of a junction box according to the invention.

FIG. 6 shows another preferred embodiment of a junction box 110 according to the invention.

Box 110 includes a pair of bottom threaded holes 114 and 118 provided in each one of paired support lugs 124.

Support lug 124 may be configured substantially the same as support lug 40 described above, or other support lugs described below.

A feature of junction box 110 is that threaded bottom hole 114 is provided with a label "8-32" and "FIXTURE". Likewise, threaded bottom hole 118 is labeled "10-32" and "FAN".

Conventional light fixtures have thread sizes which differ from the thread sizes of conventional fans. Thus, by labeling hole 114 "FIXTURE" the user knows to attach a light fixture to the two (2) oppositely paired holes labeled "FIXTURE" and "8-32".

Installation of a ceiling fan is made by using the two (2) opposite holes 118 labeled "FAN". To further assist the user, the standard industry designation for screw sizes is likewise provided; e.g., "10-32" is a standard designation for a particular screw size. Thus, even if the user has no fasteners, the user can readily determine which size fasteners to purchase to install a device.

Figure 7:
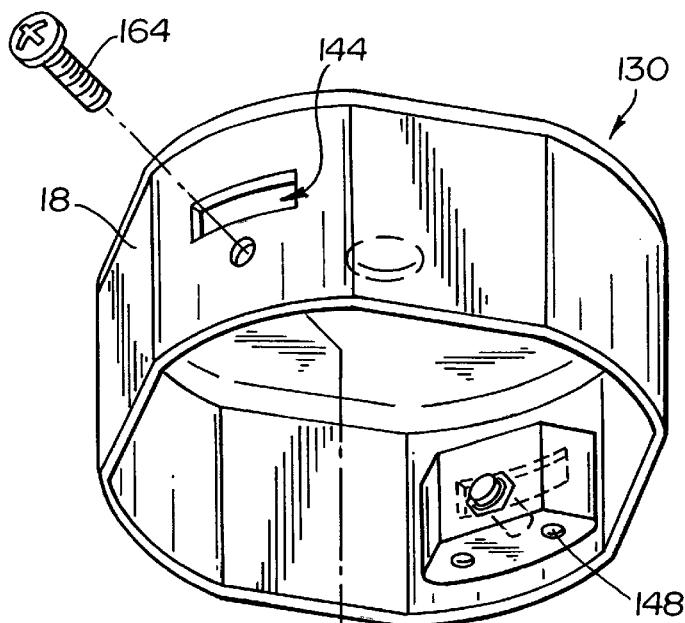
FIG. 7 is a bottom perspective view of another preferred embodiment of a junction box according to the invention, shown partially assembled.
Figure 8:
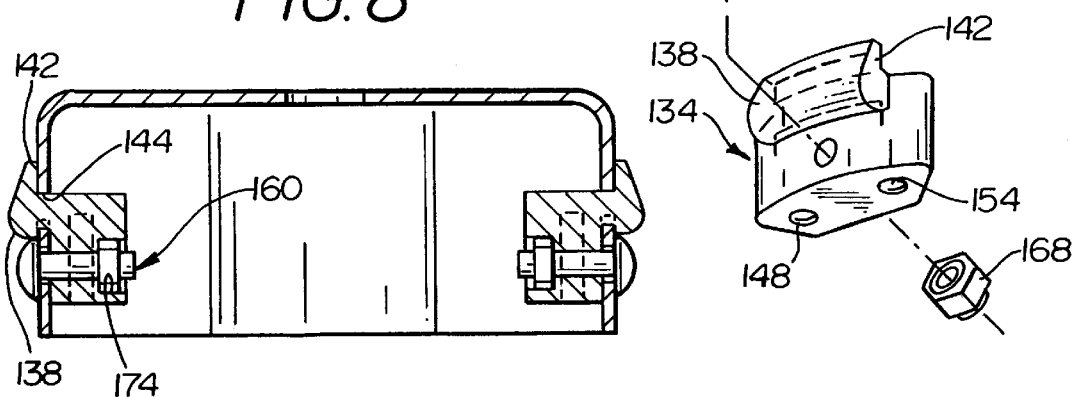
FIG. 8 is a cross-sectional view of the preferred embodiment of the junction box of FIG. 7.
Figure 9:
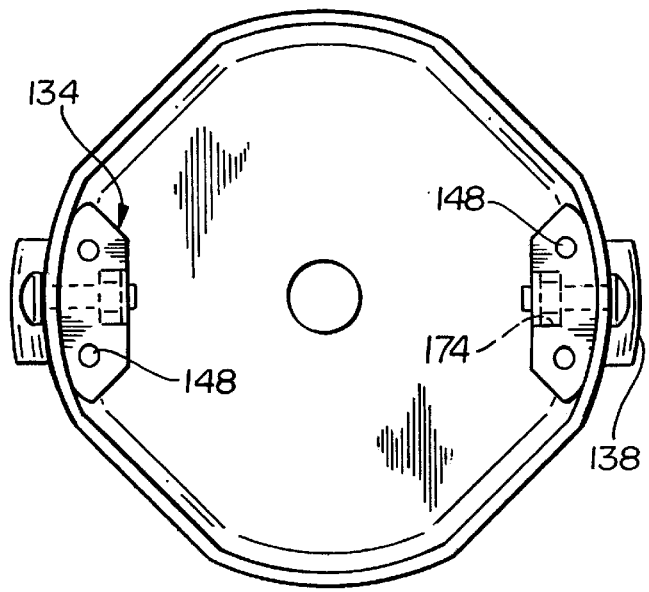
FIG. 9 is a bottom plan view of the junction box of FIG. 7.

The preferred embodiment of a junction box 130 illustrated in FIGS. 7–9 includes a lug 134 having extensions 138 extending outwardly therefrom for engaging holes 144.

An extension 138 is provided on support lug 134 and is insertable through hole or seat 144. A lip 142 may be provided on extension 138 that cooperates in resisting movement of lug 134 away from side wall 18. For example, extension 138 and lip 142 restrict clockwise movement of lug 134, as viewed in FIG. 8. Such resistance to clockwise rotation is advantageous given that a fixture supported by ones of threaded holes 148 and 154 would tend to exert such a rotational movement on lug 134.

For added stability and integrity, a fastener 160 may be provided for attaching lug 134 to side wall 18. Fastener 160 may comprise a screw 164 and a locking nut 168.

A recess 174 may be provided in lug 134 for receiving lock nut 168. Preferably, recess 174 is configured for engaging with the sides of lock nut 168 for resisting rotation thereof relative to screw 164.

Extensions 138 are particularly suited for restricting rocking movements of lug 134; i.e., restricting movement of support lug 134 within horizontal and vertical planes.

It will be appreciated that restricting the tendency of lug 134 to move helps maintain the integrity of the initial connection between lug 134 and junction box 130; e.g., the connection between side wall 18 and lug 134, between fastener 160 and an auxiliary support lug 134, and between lock nut 168 and screw 164.

Still further, restricting such tendency of lug 134 to rotate within a vertical plane helps to ensure that an auxiliary support lug 134 extends substantially parallel to side wall 18 of junction box 130 before and during use. Needless to say, all those aspects of fine-tuning of the connection between an auxiliary support lug 134 and the remainder of junction box 130 are geared for maintaining the strength and integrity of box 130, and for achieving predictability of where the threaded holes 148 and 154 are located.

Needless to say, the disclosed connections and configurations act to restrict all movements between support lug 134 and the remainder of box 130. The above discussion regarding restriction movement within a "vertical" plane is merely an example, and all movement with a "horizontal" plane is likewise restricted.

All the advantages described regarding the stabilizing of an auxiliary support lug 134 relative to the remainder of junction box 130 hold true for all the other preferred embodiments of the invention.

Figure 10:
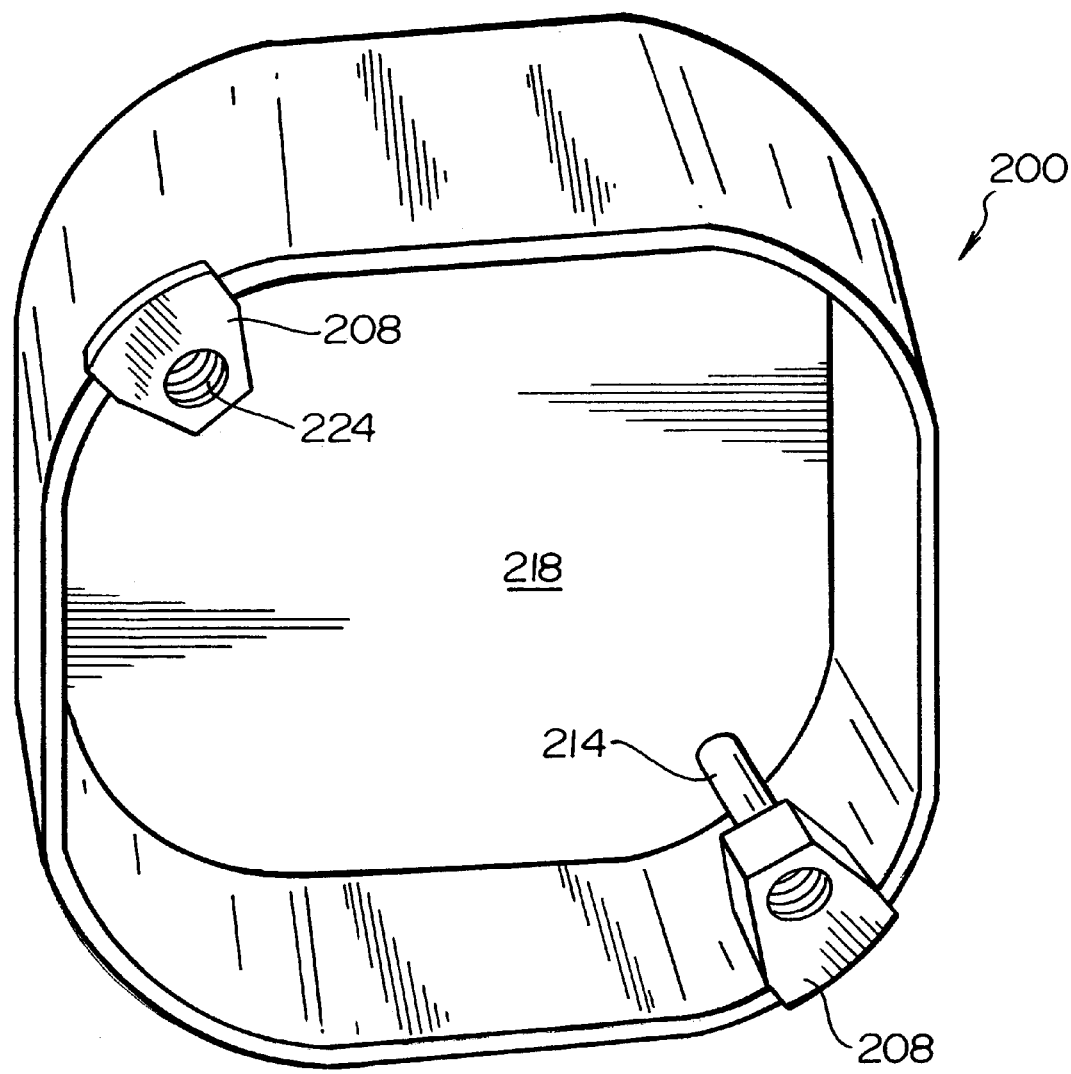
FIG. 10 is a bottom persective view of another junction box according to the invention.

FIG. 10 illustrates yet another preferred embodiment of a junction box 200 according to the invention.

Junction box 200 includes two spaced apart support lugs 208, similar to support lugs described elsewhere. Junction box 200 includes fasteners 214 for attaching support lug 208 to a top wall 218 of junction box 200.

Fasteners 214 have the advantage that they are free of exposed threads.

Namely, there are threads only along the length of fastener 214 which engages a fixture supporting hole 224 and, optionally, uppermost threads for engaging a threaded hole through top wall 218, as desired.

An advantage of fastener 214 having no exposed threads (i.e., being substantially smooth) within the interior or cavity of junction box 200, is that such fasteners may be used in applications/regions where there is a concern that exposed threads might cut the plastic coating of plastic-coated electrical wire and, hence, perhaps lead to corrosion of such exposed electrical wire or failure of the electrical device.

FIGS. 11 and 12 show another preferred embodiment of an electrical junction box 230 according to the invention.

Junction box 230 is similar to junction box 10 of FIGS. 2 and 3. A difference is that junction box 230 has a single pair of paired threaded holes for supporting fixtures.

Specifically, a fastener 232 attaches a fixture supporting lug 240 to a side wall of junction box 230. One threaded hole 256 is provided in a lower portion of each lug 240.

Junction box 230 is particularly suited for situations where it is desirable to only provide a single pair of fixture supporting holes 256. Such situations might include single-use junction boxes, and junction boxes which are provided by the manufacturer along with a particular light fixture or ceiling fan, so that the user need not take the step of determining which one of two paired holes to use.

Needless to say, all the strength advantages, and advantages of resistance to movement, rotation, and loosening of connections between fastener 232, support lug 240, and remainder of the box all hold true for this embodiment.

FIG. 13 illustrates yet another preferred embodiment of a junction box 280 according to the invention.

Junction box 280 is similar to the junction box of FIGS. 2, 10 and 11, yet has the additional feature of their being four (4) fixture support studs 240 engaged with a lower portion thereof.

Some advantageous features of junction box 280 include that oppositely paired ones of support lugs 240 may have the proper screw sizes for supporting a light fixture or a ceiling fan, for example. Namely, the illustrated left and right lugs 240 could be provided with threaded holes 256 for supporting ceiling fans, while the top and bottom threaded support holes could be provided with the threads used for typical light fixtures.

Another advantage of junction box 280 is that each of the four (4) illustrated lugs 240 could be used to support a fixture of the type requiring four (4) threaded support holes 256.

It will now be seen that the exemplary junction boxes described above have exploited the properties of the top wall and side wall in combination with the configuration and disposition of the support lug for making a unified junction box which works better than known junction boxes.

It will be appreciated that these are merely examples of solutions to the problems set forth in the accompanying drawings and description, and, taken in its entirety, it will be appreciated that all the above objects of the invention, as well as many others, have been fulfilled.

It will likewise be appreciated that all the components described in the foregoing can be made of a variety of materials, such as steel, zinc, nylon, and other plastics, as the producer and user demand.

While this invention has been described as having a preferred design, it is understood that it is capable of further modification, uses and/or adaptations following in general the principle of the invention and including such departures from the present disclosures as come within known or customary practice in the art to which the invention pertains, and as may be applied to the essential features set forth, and fall within the scope of the invention or the limits of the appended claims.

I claim:

1. A mounting assembly, comprising:
a) a junction box including a top wall and a side wall;
b) said side wall extending downwardly away from said top wall and defining a cavity therein;
c) a fixture support lug disposed in said cavity;
d) a seat provided in said side wall;
e) said seat defining at least one face;
f) said fixture support lug extending into said seat and engaging said at least one face;
g) a fastener disposed adjacent said top wall and securing said fixture support lug to said top wall; and,
h) said fastener including a screw.

2. An assembly as defined in claim 1, wherein:
a) a threaded hole is provided on said fixture support lug.

3. An assembly as defined in claim 2, wherein:
a) a fastener secures said lug to said top wall of said box.

4. An assembly as defined in claim 2, wherein:
a) an adhesive is disposed on said top wall of said box.

5. An assembly as defined in claim 1, wherein:
a) a fastener is disposed adjacent at least one of said top wall and said side wall and said fastener secures said fixture support lug to said at least one of said top wall and said side wall.

6. An assembly as defined in claim 5, wherein:
a) said fastener includes a threaded support member.

7. An assembly as defined in claim 6, wherein:
a) said threaded support member has substantially no exposed threads when said threaded support member secures said fixture support lug to said top wall.

8. An assembly as defined in claim 1, wherein:
a) said fixture support lug has an exposed surface which is sufficiently smooth for avoiding wear to plastic-coated electrical wire which engages said exposed surface when said junction box is in use.

9. An assembly as defined in claim 1, wherein:
a) a top threaded hole is provided on a top portion of said fixture support lug; and,
b) a bottom threaded hole is provided on a bottom portion of said fixture support lug.

10. An assembly as defined in claim 1, wherein:
a) a bottom threaded hole is provided on a bottom portion of said fixture support lug.

11. An assembly as defined in claim 10, wherein:
a) said bottom threaded hole is configured for receiving a fastener of a light fixture to be supported by said fixture support lug.

12. An assembly as defined in claim 11, wherein:
a) a further bottom threaded hole is provided on said bottom portion of said fixture support lug and is configured for receiving a fastener of a fan to be supported by said fixture support lug.

13. An assembly as defined in claim 1, wherein:
a) said seat is disposed at a bottom free edge of said side wall.

14. An assembly as defined in claim 13, wherein:
a) said seat is provided above said bottom free edge of said side wall.

15. An assembly as defined in claim 1, wherein:
a) an extension is provided on said fixture support lug; and,
b) said extension engages said at least one face and a portion of said side wall.

16. An assembly as defined in claim 15, wherein:
a) a lip is provided on said extension; and,
b) said lip engages said side wall.

17. An assembly as defined in claim 1, wherein:
a) a fastener secures said lug to said side wall of said box.

18. A device as in claim 1, wherein:
a) said fixture support is secured to said top wall so that downwardly acting forces applied to said fixture support are carried substantially directly by said top wall.

19. A device as in claim 1, wherein:
a) said fixture support lug is detachably attached to said seat.

20. An assembly as defined in claim 1, wherein:
a) an adhesive is disposed on said top wall of said box.

21. A device as in claim 1, wherein:
a) said fixture support lug extends away from said seat into said junction box cavity.

22. Assembly as defined in claim 1, wherein:
a) an adhesive is disposed on said top wall, said adhesive being sufficiently strong to attach said junction box to a support surface.

23. A mounting assembly, comprising:
a) a junction box having a top wall and a downwardly extending side wall defining a cavity therein;
b) a first fixture support disposed adjacent said cavity, said first fixture support being sized for engaging a first size of fastener;
c) a portion of said first fixture support being configured for preventing movement of said first fixture support relative to said side wall;
d) a second fixture support disposed adjacent said cavity, said second fixture support being sized for engaging a second size of fastener; and,
e) said second fixture support differing in size from said first fixture support for engaging a second size of fastener differing in size from the size of the first size of fastener.

24. An assembly as in claim 23, wherein:
a) said first fixture support is sized for engaging a light fixture fastener.

25. An assembly as in claim 23, wherein:
a) said second fixture support is sized for engaging a ceiling fan fastener.

26. An assembly as in claim 23, wherein:
a) said first fixture support is sized for engaging an 8-32 fastener.

27. An assembly as in claim 23, wherein:
a) said second fixture support is sized for engaging a 10-32 fastener.

28. An assembly as in claim 23, wherein:
a) said first fixture support is sized for engaging a ceiling fan fastener; and,
b) said second fixture support is sized for engaging a light fixture fastener.

29. An assembly as in claim 23, wherein:
a) said first fixture support is sized for engaging an 8-32 fastener; and,
b) said second fixture support is sized for engaging a 10-32 fastener.

30. An assembly as defined in claim 23, wherein:
a) said first fixture support is disposed at a distance from said top wall.

31. An assembly as defined in claim 23, wherein:
a) said second fixture support is disposed at a distance from said top wall.

32. An assembly as in claim 23, wherein:
a) said side wall of said junction box includes a lower free edge disposed at a distance from said top wall; and,
b) at least one of said first fixture support and said second fixture support is disposed adjacent to said lower free edge of said junction box.

33. An assembly as defined in claim 23, wherein:
a) at least one of said first and second fixture supports is disposed within said cavity.

34. An assembly as defined in claim 23, wherein:
a) said portion of said first fixture support is configured for preventing rotation of said first fixture support relative to said side wall.

35. An assembly as defined in claim 23, wherein:
a) said portion of said first fixture support includes an extension which engages said side wall.

36. Assembly as defined in claim 23, wherein:
a) an adhesive is disposed on said top wall, said adhesive being sufficiently strong to attach said junction box to a support surface.

37. An assembly as in claim 23, wherein:
a) said first and second fixture supports are spaced apart from each other.

38. An assembly as in claim 37, wherein:
a) said first fixture support includes a pair of first fixture supports;
b) the first fixture supports of said pair of first fixture supports are disposed on a left and right side of said junction box; and,
c) said second fixture support is disposed at a front side of the junction box.

39. An assembly as defined in claim 23, wherein:
a) said first fixture support is configured for engaging a male fastener.

40. An assembly as defined in claim 39, wherein:
a) said second fixture support is configured for engaging a male fastener.

41. An assembly as defined in claim 23, wherein:
a) said first fixture support includes a threaded hole.

42. An assembly as defined in claim 41, wherein:
a) said second fixture support includes a threaded hole.

43. An assembly as in claim 23, wherein:
a) said side wall of said junction box includes a lower free edge disposed at a distance from said top wall; and,
b) both said first and second fixture supports are disposed adjacent to said lower free edge of said junction box.

44. An assembly as in claim 43, wherein:
a) said first and second fixture supports are spaced apart from each other.

45. An assembly as in claim 44, wherein:
a) said first fixture support includes a pair of first fixture supports;
b) the first fixture supports of said pair of first fixture supports are disposed on a left and right side of said junction box; and,
c) said second fixture support is disposed at a front side of the junction box.

46. An assembly as defined in claim 45, wherein:
a) said second fixture support includes a pair of second fixture supports; and,
b) the second fixture supports of said pair of second fixture supports are disposed on a front and rear side of said junction box.

47. An assembly as in claim 46, wherein:
a) said pair of first fixture supports is sized for engaging a ceiling fan fastener; and,
b) said pair of second fixture supports is sized for engaging a light fixture fastener.

48. An assembly as defined in claim 23, wherein:
a) said first fixture support includes a pair of first fixture supports;
b) said first and second fixture supports are spaced apart from each other;
c) said second fixture support includes a pair of second fixture supports; and,
d) the second fixture supports of said pair of second fixture supports are disposed on a front and rear side of said junction box.

49. An assembly as in claim 48, wherein:
a) the first fixture supports are sized for engaging a ceiling fan fastener; and,
b) the second fixture supports are sized for engaging a light fixture.

50. An assembly as defined in claim 48, wherein:
a) an adhesive is disposed on said top wall of said junction box.

51. An assembly as defined in claim 50, wherein:
a) said adhesive includes a piece of double-sided tape.

52. A mounting assembly comprising:
a) a junction box having a wall defining a cavity therein;
b) a fixture support attached to said wall;
c) said fixture support being provided adjacent a downwardly extending portion of said wall;
d) a first opening provided in said wall;
e) a fixture support fastener extending through said first opening in said wall;
f) said fixture support fastener including a head disposed adjacent said wall;
g) said fixture support fastener including a threaded extension extending away from said head;
h) a female fastener disposed on said threaded extension and securing said fastener to said wall;
i) said fixture support being disposed on said threaded extension;
j) a first fixture fastener being provided on said fixture support, said first fixture fastener being sized for attaching a first size of fastener thereto; and,
k) a second fixture fastener is provided on said fixture support, said second fixture fastener being sized for attaching a second size of fastener thereto, and said second size differing from said first size of fastener.

53. An assembly as in claim 52, wherein:
a) said fixture support includes metal.

54. An assembly as in claim 52, wherein:
a) said fixture support is attached to said downwardly extending portion of said wall.

55. An assembly as in claim 52, wherein:
a) said fixture support is disposed directly adjacent to said wall.

56. An assembly as in claim 52, wherein:
a) at least one of said first and second fixture fasteners includes a female fastener.

57. An assembly as in claim 52, wherein:
a) said female fastener secures said fastener and said fixture support to said wall.

58. An assembly as in claim 52, wherein:
a) a second opening is provided on said fixture support; and,
b) said threaded extension extends into said second opening.

59. An assembly as defined in claim 52, wherein:
a) said fixture support includes plastic.

60. An assembly as defined in claim 52, wherein:
a) said threaded extension includes threads over a majority of the length of said fixture support fastener.

61. An assembly as defined in claim 52, wherein:
a) said first opening is provided in said downwardly extending portion of said wall.

62. An assembly as in claim 52, wherein:
a) said female fastener includes a nut.

63. An assembly as in claim 62, wherein:
a) said nut includes a lock nut.

64. An assembly as in claim 52, wherein:
a) said first fixture fastener includes a female fastener.

65. An assembly as in claim 64, wherein:
a) said fixture support is attached to said downwardly extending portion of said wall.

66. An assembly as defined in claim 52, wherein:
a) an adhesive is disposed on said top wall, said adhesive being sufficiently strong to attach said junction box to a support surface.

67. An assembly as defined in claim 66, wherein:
a) said adhesive includes double-sid ed t ape.

68. A mounting assembly, comprising:
a) a junction box having a top wall and a downwardly extending side wall defining a cavity therein;
b) a first fixture support disposed adjacent said cavity, said first fixture support being sized for engaging a first size of fastener;
c) said first fixture support being disposed in a substantially vertical plane, a portion of said first fixture support being configured for preventing rotation of said first fixture support within said substantially vertical plane;
d) a second fixture support disposed adjacent said cavity, said second fixture support being sized for engaging a second size of fastener; and,
e) said second fixture support differing in size from said first fixture support for engaging a second size of fastener differing in size from the size of the first size of fastener.

69. An assembly as defined in claim 68, wherein:
a) said portion of said first fixture support includes an extension which engages said side wall.

70. An assembly as defined in claim 69, wherein:
a) a recess is provided in same side wall; and,
b) said extension extends into said recess.

71. An assembly as defined in claim 70, wherein:
a) said recess includes a hole extending through said side wall, and said extension extends through said hole and along said side wall.

* * * * *